Figure 1A:
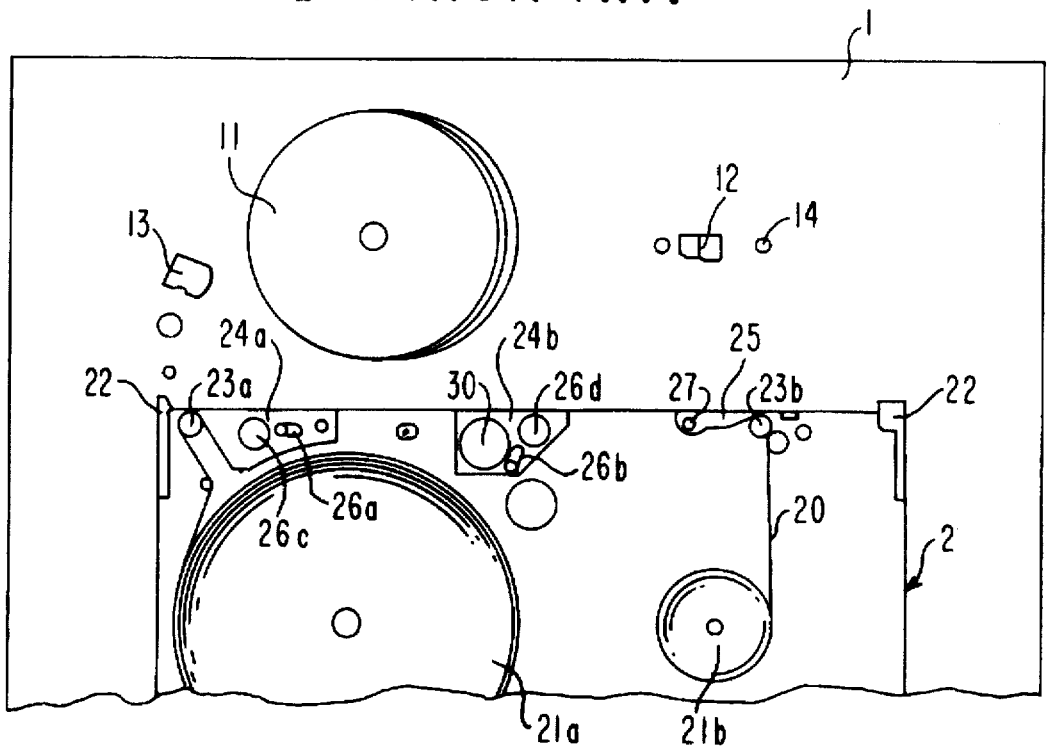

United States Patent [19]

Weisser et al.

[11] Patent Number: 5,663,849
[45] Date of Patent: Sep. 2, 1997

[54] TAPE PINCH ROLLER ACTUATION DEVICE

[75] Inventors: Fritz Weisser; Erhard Lauble, both of St. Georgen, Germany

[73] Assignee: Deutsche Thomson-Brandt GmbH, Villengen-Schwenningen, Germany

[21] Appl. No.: 437,545

[22] Filed: Mar. 15, 1995

Related U.S. Application Data

[63] Continuation of Ser. No. 46,964, Apr. 16, 1993, abandoned.

[30] Foreign Application Priority Data

Apr. 30, 1992 [DE] Germany ................. 42 14 270.9

[51] Int. Cl.$^6$ .................................................. G11B 5/008
[52] U.S. Cl. .................................................. 360/96.4
[58] Field of Search ........................ 360/85, 90, 96.4, 360/130.23, 130.32; 226/90

[56] References Cited

U.S. PATENT DOCUMENTS

| | | | |
|---|---|---|---|
| 3,831,198 | 8/1974 | Kihara et al. | 360/85 |
| 3,884,407 | 5/1975 | Sugimizu | 360/90 |
| 5,253,132 | 10/1993 | Gause et al. | 360/85 |

FOREIGN PATENT DOCUMENTS

| | | |
|---|---|---|
| 353270 | 1/1971 | U.S.S.R. |
| 832594 | 5/1981 | U.S.S.R. |

OTHER PUBLICATIONS

Patent Abstracts of Japan vol. 14 No. 207 (P-1043) Feb. 15, 1990.

*Primary Examiner*—Robert S. Tupper
*Assistant Examiner*—David D. Davis
*Attorney, Agent, or Firm*—Joseph S. Tripoli; Thomas F. Lenihan

[57] ABSTRACT

An actuating device for a pinch roller in a tape recording and/or playing device has a capstan spindle driven by a mechanism supported on a chassis. A pinch lever supports the pinch roller. At least one drive lever is rotatably coupled to the pinch lever and mounted to pivot about a fixed axis normal to the chassis for swiveling the pinch roller between resting and working positions. A spring connects the pinch lever and the at least one drive lever for urging the pinch roller against the capstan spindle only in the working position. A first guide controls the swiveling of the at least one drive lever. A lift roller is rotatably supported by the pinch lever and disposed in proximity to the pinch roller. The lift roller has a cylindrical region and a conical region having a diameter which increases in a direction away from the chassis. A second guide controls engagement of the pinch roller and the capstan spindle in response to the swiveling and in the working position by imparting a motion to the pinch lever in the direction away from the chassis during the swiveling. In an embodiment having two drive levers, the first and second drive levers and the spring form an inherently rigid lever system when the pinch roller is not in the working position.

8 Claims, 4 Drawing Sheets

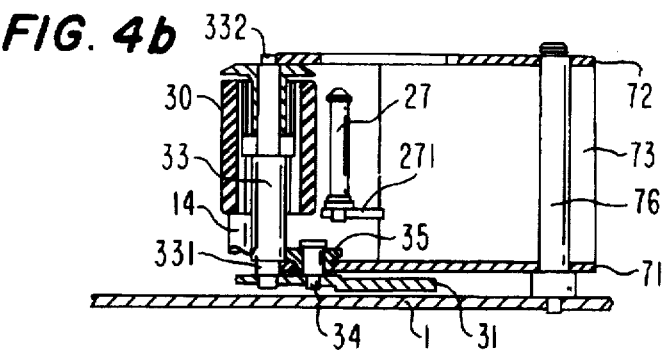
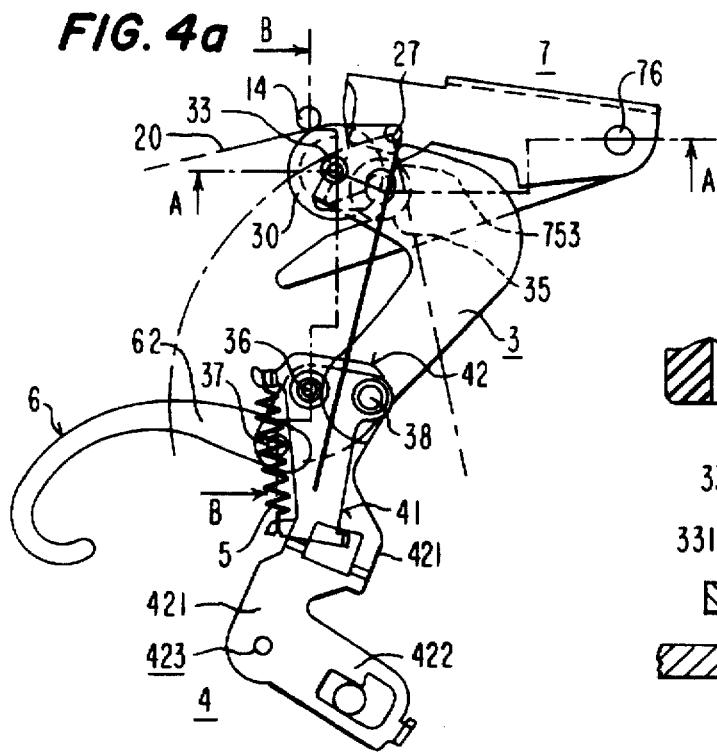
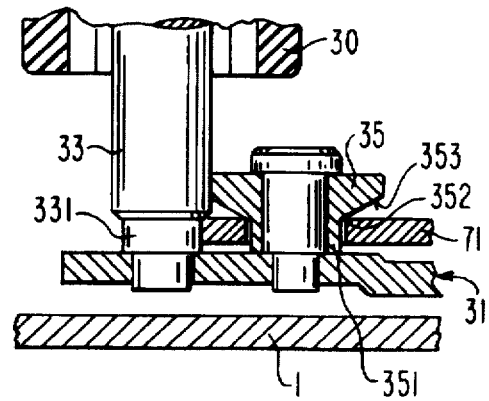
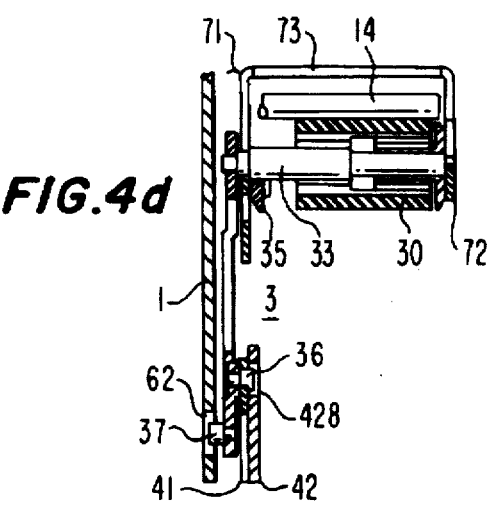

TAPE PINCH ROLLER ACTUATION DEVICE

This is a continuation of application Ser. No. 08/046,964 filed on Apr. 16, 1993 now abandoned.

The invention relates to the field of tape pinch roller actuation devices, which control engagement of a pinch roller and a capstan spindle in a tape recording and/or playing device.

In order to ensure the necessary tape transport in recorders for information recording and/or playback having a tape-type recording medium, the latter is known to be pressed by the pinch roller against the capstan spindle, which rotates at constant speed, with the result that it is driven at constant speed and can consequently run past the recording and/or playback heads.

In commercial recorders such as, for example, video recorders, in which the recording medium is mounted in a cassette, it is usual to arrange the capstan spindle so that, when a cassette is inserted, the capstan spindle is inserted into a recess provided in, or at the outside periphery of, the cassette. Tape guides provided inside the cassette ensure that, in this process, the recording medium runs in front of the capstan spindle. This arrangement of the capstan spindle has the advantage that the swivelling of the pinch roller onto or away from the capstan spindle can be achieved by an actuation device of relatively simple construction.

It has been found, however, that, in the case of recorders employing the helical-scan method, such an arrangement of the capstan spindle is not optimum, in particular for the "reverse" search mode. In more recent recorders which employ the abovementioned method, therefore, the capstan spindle is arranged on the drive mechanism chassis outside the region provided for the cassette. This means that the pinch roller has in principle to be brought into engagement with the capstan spindle by swivelling in a direction opposite to that indicated above. However, a relatively high control and/or constructional complexity for the actuation of the pinch roller is also associated with a capstan spindle arranged in this way.

Thus, for example, in the case of a video recorder having the type designation "Cityline" manufactured by the Matsushita company, the pinch roller is brought into engagement with the capstan spindle after unloading the recording medium from the inserted cassette by first bringing the pinch roller between cassette and recording medium with the aid of an elevator and then moving it towards the capstan spindle. In another recorder having the type designation "VR 6760" manufactured by the Grundig company, the recess provided in the cassette for the loading element of the drive mechanism on the take-up side is used for the pinch roller rest position by accommodating the loading element, together with the pinch roller, in the recess of the inserted cassette. For the purpose of engagement with the capstan spindle, the pinch roller is moved towards the capstan spindle by means of a toothed rack after unloading the recording medium and is pressed against the capstan spindle with the aid of a fork which acts on the bearing spindle of the pinch roller.

The object of the invention is to provide a pinch roller actuation device which can be manufactured inexpensively, in particular in view of its use in a recorder having a capstan spindle arranged on the drive mechanism chassis outside the cassette region and with which frictional losses, which reduce the pinching force for the pinch roller on the capstan spindle, can be reduced.

To actuate the pinch roller in, and out of, engagement with the capstan spindle in a cassette recorder, in particular in a video recorder having a capstan spindle arranged on the drive mechanism chassis outside the cassette region, an actuation device is provided which essentially comprises a pinch lever which supports the pinch roller rotatably, a drive device which serves to actuate the pinch lever, comprises at least one lever and is linked to the actuation side of the pinch roller and which is mounted so as to be rotatable around a swivel shaft arranged in a fixed position on the chassis, and a second roller, referred to below as lift roller, which is rotatably mounted on a shaft parallel to the pinch roller and which comes into engagement with a guide arranged at a preset height and position on the chassis when the pinch roller is swivelled into the working position, an in principle conically shaped region on the lift roller effecting a lifting of the pinch roller by the action of the guide on said region.

The actuation device forms a mechanical unit. The pinch roller is transported between its rest position and its working position or vice versa by swivelling the actuation device around the swivel shaft of the drive device. As a result of the abovementioned interaction of the lift roller with the guide, a lift movement perpendicular to the chassis is superimposed on the swivelling movement, with the result that the pinch roller is lowered in order to swivel it into the abovementioned cassette recess and is lifted correspondingly in order to engage with the capstan spindle and recording medium. Associated with this is the advantage that a chassis contact of the actuation device which produces friction and which would otherwise appreciably impair the action of an energy storage mechanism on the pinch roller for pressing the latter against the capstan spindle is avoided in the pinch roller working position.

The guide which effects the lifting of the actuation device together with the lift roller is advantageously combined with a supporting device for the pinch roller. Such a supporting device, with which the shaft of the pinch roller is brought into engagement on reaching its working position, limits the pinch roller with regard to its height position, influences its parallelism with the capstan spindle and ensures a uniform distribution of the force, stored in the energy storage mechanism, during pressing of the pinch roller against the capstan spindle. As a result, a more exact parallel guidance, which is critical for a constant height position of the recording medium to be driven, in particular during reverse search is achieved.

Associated with the actuation device according to the invention is, furthermore, the advantage that the energy storage mechanism can be constructed in a simple way by holding, in a pretensioned manner, a spring element, which is arranged in the actuation device and which links two adjustable lever arms to one another by a stop for one of the two lever arms, with the result that no external force is required for force storage. As soon as the pinch roller engages with the capstan spindle or is pressed against it, the lever arm stop is released in response thereto, with the result that the force from the pretensioned spring element acts fully on the capstan spindle.

Actuation device and supporting device are distinguished by the use of means requiring less complexity. Because of the use of simple means, the manual effort for the assembly of the actuation device and supporting device is also low.

Figure 1B:
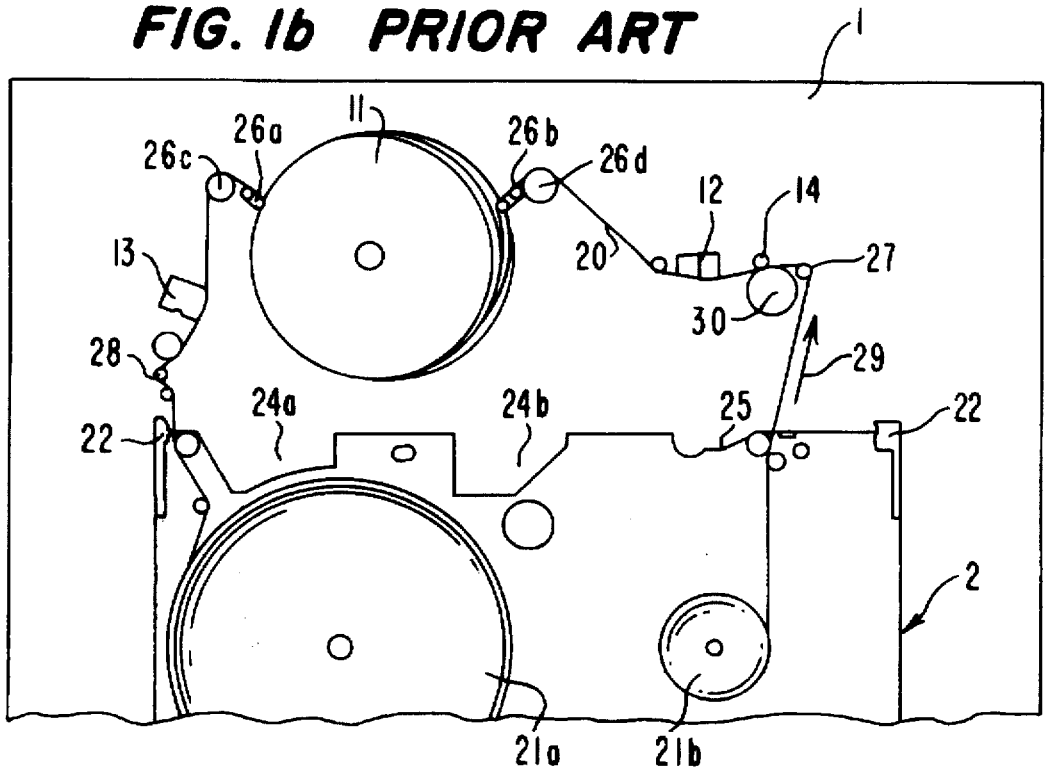
Figure 2:
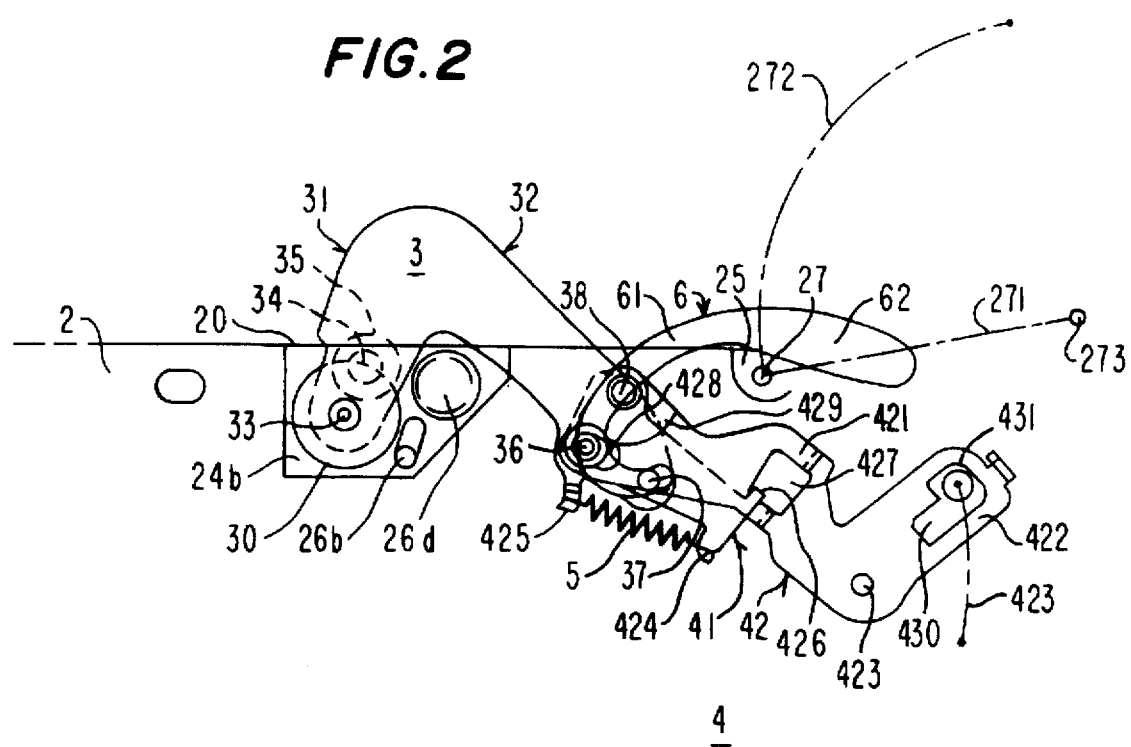
Figure 3A:
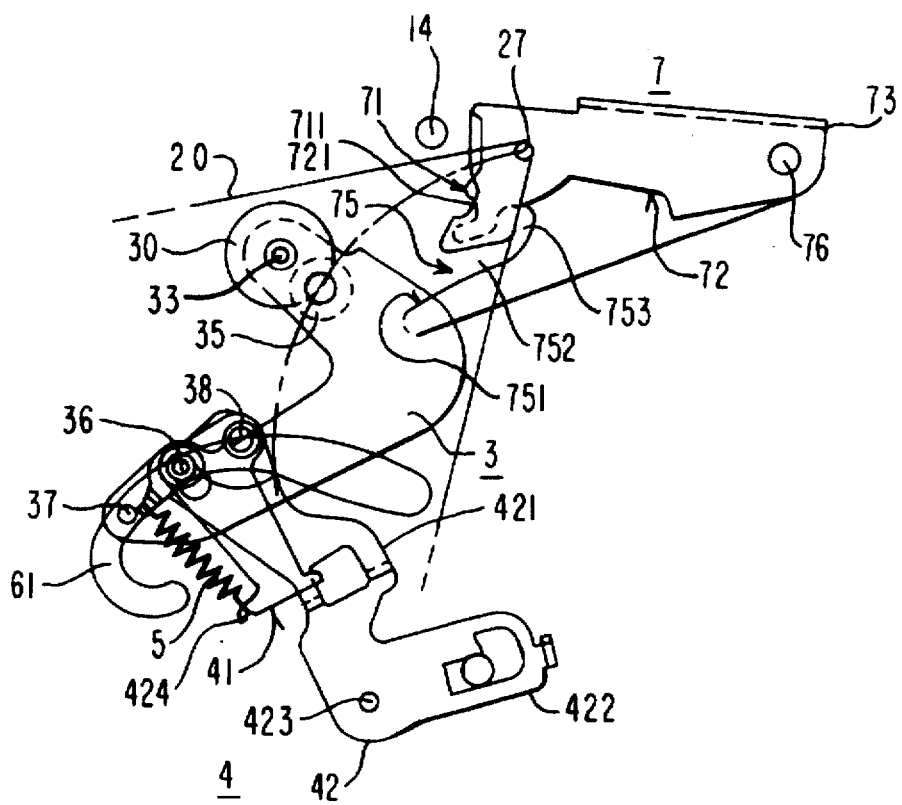
Figure 3B:
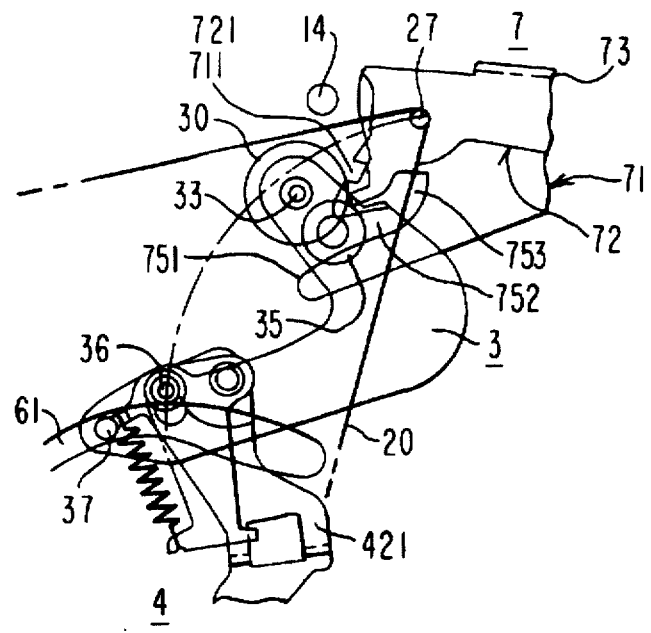
Figure 3C:
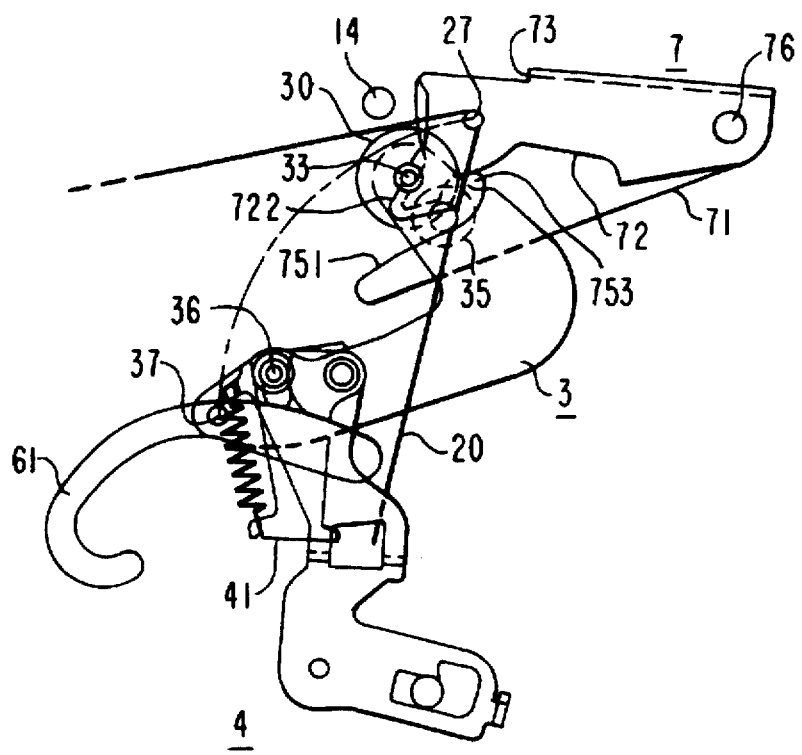

The invention is explained below in greater detail in an exemplary embodiment with reference to the figures. In the drawing:

FIG. 1a shows diagrammatically, on a reduced scale, a drive mechanism chassis for a known tape cassette in plan view, FIG. 1b shows diagrammatically a plan view of the same drive mechanism chassis with the recording medium unloaded from the tape cassette, FIG. 2 shows diagrammatically a plan view, on an enlarged scale, of a subregion of the same drive mechanism chassis with an actuation device for the pinch roller, which is situated in the rest position, FIG. 3a shows the subregion as shown in FIG. 2 with a first intermediate position of the pinch roller, FIG. 3b shows a second intermediate position of the pinch roller, FIG. 3c shows the subregion as shown in FIG. 2 with a third intermediate position of the pinch roller, FIG. 4a shows the subregion as shown in FIG. 2, with the working position of the pinch roller, FIG. 4b shows a first sectional representation of essential elements of FIG. 4a, FIG. 4c shows a subregion of the sectional representation as shown in FIG. 4b on an enlarged scale, FIG. 4d shows a second sectional representation of essential elements of FIG. 4a.

FIGS. 1a and 1b show diagrammatically on a reduced scale an exemplary drive mechanism having a chassis 1. Arranged on the chassis 1 in a manner known per se are: a rotatable head drum 11 for helical-track recording and/or playback and stationary heads 12, 13 for longitudinal track recording and/or playback of signals using a tape-type recording medium mounted in a cassette having a known structure, and a capstan spindle 14 for driving the recording medium by means of a pinch roller 30. The capstan spindle 14 is arranged outside the chassis region provided for the cassette. Such a cassette 2 of known structure containing a recording medium 20 is situated in the operating position on the chassis 1, in which position the two tape reels 21a, 21b of the recording medium 20 are each engaged with a drive mandrel (not shown) of the drive mechanism and the tape protection flap 22 of the cassette 2 is swung upwards.

In this drawing, FIG. 1a shows the drive mechanism with the cassette 2 in the stop or standby mode and FIG. 1b shows it with the cassette 2 in the play mode of the recorder.

The front cassette housing wall, which is otherwise covered by the tape protection flap 22 and against which rests to which is, as indicated in FIG. 1a, the recording medium 20 between the two cassette deflection rollers 23a, 23b, has recesses 24a; 24b; 25 into which, as shown in FIG. 1a, loading elements 26a, 28; 26b; 27 and tape deflection rollers 26c; 26d coupled to the loading elements 26a; 26b are inserted. The loading elements 26a; 26b, with their respective tape deflection roller 26c; 26d are also referred to as a loading carriage. They can be used to loop the recording medium 20 around the head drum 11. They can be driven by the loading motor via the drive mechanism mode control mechanics. Drive mechanism mode control mechanics and loading motor are not shown since they are not essential to the invention. The loading element 28 is part of a tape tension control. As is further shown in FIG. 1a, the free space due to the recess 24b is also utilised to accommodate the pinch roller 30 when in the rest position.

As shown in FIG. 1b, for the play mode of the recorder, the recording medium 20 is unloaded from the cassette 2 by means of the loading elements 26a, 26b, 27, 28 and applied to the rotating head drum 11 and to the stationary heads 12, 13. As is further shown in FIG. 1b, pinch roller 30 is located in its working position. In this situation, it is pressed, together with the recording medium 20, against the rotating capstan spindle 14 by the action of an energy storage mechanism (FIG. 4a) in order to drive said recording medium 20. An arrow 29 indicates the direction in which the recording medium 20 is driven in the "reverse" search mode. The respective actuations of pinch roller 30 and loading elements 27, 28 and of the loading carriages (when the recorder play mode is switched on or off) are carried out in a known sequence.

An actuation device is provided for actuating the pinch roller 30. It is rotatably mounted on a swivel shaft 423 (FIG. 2) which is in a fixed position vertical to the chassis 1 and forms a mechanical unit with the pinch roller 30. The pinch roller 30 is actuated between its rest position and its working position or vice versa by swivelling the actuation device around the swivel shaft 423, a slight lifting movement perpendicular to the chassis 1 being superimposed, according to the invention, on the swivelling movement of the actuation device between a rest position and working position in such a way that the swivelling device is lowered to swivel the pinch roller 30 into the recess 24b (FIGS. 1a and 2) and is correspondingly raised to bring the pinch roller 30 into engagement with the capstan spindle 14.

The actuation device is described below by reference to FIGS. 2–4d. In FIGS. 1a–4d, corresponding objects are provided with corresponding reference symbols.

FIG. 2 shows the actuation device, together with the pinch roller 30, in a position corresponding to the rest position as shown in FIG. 1a. In this position, the pinch roller 30, which is a first roller which is rotatably arranged on the actuation device, is inserted in the cassette recess 24b assigned to the right-hand side loading carriage having loading element 26b and tape deflection roller 26d. The loading element 27 is inserted in the cassette recess 25. As can be seen from the position of the loading element 27 as shown in FIG. 1b, FIGS. 3a–3c and FIG. 4a, the recording medium 20 can be moved towards the capstan spindle by the loading element 27. For this purpose, a lever 271 (FIG. 4b, shown in a dot/dash line in FIG. 2) supporting the loading element 27 can be swivelled around an axis 273 which is fixed with respect to the chassis 1, which lever 271 can be actuated by said drive mechanism mode control mechanics. The corresponding swivelling range for the loading element 27 is indicated by a dot-dash line 272.

The actuation device contains, as essential components, a pinch lever 3, which supports the pinch roller 30 and a lift roller 35, and a drive device 4, essentially comprising a first lever 41 and a second lever 42, referred to below as intermediate lever 41 and drive lever 42, for actuating the pinch lever 3. The actuation device rests on the chassis 1 by means of the pinch lever 3. The intermediate lever 41, which forms the mechanical link between the drive device 4 and the pinch lever 3, is arranged in terms of height, as shown in the sectional representation as shown in FIG. 4d, between pinch lever 3 and drive lever 42.

In FIG. 2 the drive lever 42 has two lever arms 421, 422 extending at an angle to one another, referred to below as first and second drive lever arm 421; 422. They are mounted so as to rotate about the swivel shaft 423 arranged on the chassis 1 at its vertex. The second drive lever arm 422 forms the actuation side of the actuation device, the latter being actuated by a swivellable drive pin 431 which can be driven by said drive mechanism mode control mechanics and which engages in an opening 430 provided in the end region of the second drive lever arm 422. The corresponding actuation or swivelling range of the drive pin 431 is indicated by a line 432.

The pinch lever 3 has two lever arms 31, 32, referred to below as first and second pinch lever arm 31; 32, which likewise extend at an angle to one another. At the end of the first pinch lever arm 31, the pinch roller 30 is rotatably mounted on a vertical shaft 33 mounted on the same. Arranged at the end of the second pinch lever arm 32, which forms the actuation side of the pinch lever 3, is a pin 37 extending perpendicularly downwards. The pin 37 is engaged with a slot-type guide 61 which is essentially formed by a section of constant width of a recess 6 provided in the chassis 1. The other section 62 of the recess 6 adjoining the guide 61 is lobe-shaped. The position and path of the recess 6 are fixed. Starting from the position shown in FIG. 2 of the stud 37, the path of the recess 6 resembles a spiral which unwinds clockwise.

The intermediate lever 41, second pinch lever 32 and first drive lever arm 421 partially overlap. In this connection, when viewed from their respective vertex, the second pinch lever arm 32 extends in the rest position as shown in FIG. 2 towards the first drive lever arm 421 and the first pinch lever arm 31 towards the second drive lever arm 422, approximately in the opposite direction in each case.

Between the vertex of the two pinch lever arms 31, 32 and the pin 37, the pinch lever 3 is linked to the intermediate lever 41 by a perpendicular shaft 36. The shaft 36 forms a pivot point around which the pinch lever 3 can be swivelled with respect to the drive device 4 or the intermediate lever 41 during its actuation. Transmitted via the shaft 36 to the pinch lever 3 are both the driving force for actuating the same between a rest position and working position of the pinch roller 30 and the force from an energy storage mechanism for pressing the pinch roller 30 against the capstan spindle 14. The shaft 36, for which an elongated hole-type recess 428 is provided in the first drive lever arm 421, is preferably arranged in a fixed manner in the second pinch lever arm 32. To reduce the friction between pinch lever 3 and intermediate lever 41, the region around the shaft 36 on the second pinch lever arm 32 is shaped in a raised manner, as shown in FIG. 4d.

In FIG. 4a, the intermediate lever 41 is linked by a shaft 38, likewise vertical, to the drive lever 42 or to the end region of the second drive lever arm 422. The shaft 38 is preferably arranged in a fixed manner in the first drive lever arm 421. A spring 5 which is arranged between the lever arm 421 and the drive lever 42 and which is provided as an energy storage mechanism for pressing the pinch roller 30 against the capstan spindle 14 (as shown in FIG. 4a) is kept pretensioned and stretched by the intermediate lever 41.

As shown in FIG. 2, intermediate lever 41 forms an elongated rectangle which extends towards the swivel shaft 423 approximately parallel to the first drive lever arm 421 and is preferably about half as long as the latter. In this arrangement, the two shafts 36, 38 form the corner points assigned to the end region of the first drive lever arm 421, while the two oppositely situated corner points are formed by the engagement point 424 of the spring 5 on the intermediate lever 41 and a stop for the intermediate lever 41 on the first drive lever arm 421. Engagement point 424 and shaft 38 are situated diagonally opposite one another. Shaft 36 and a stop 426 are also situated diagonally opposite one another. The stop 426, kept pretensioned by the spring 5, is formed by an angled part of the intermediate lever 41. Angled part 426 engages in a recess 427 provided in the first drive lever arm 421 and braces the intermediate lever 41 against the first drive lever arm 421 in doing so. The other point of action of the spring is situated to the side of the shaft 36 on a laterally directed extension 425 in the end region of the first drive lever arm 421. The spring 5, which is pretensioned as a result of the abovementioned stop, has the effect that the intermediate lever 41 and the drive lever 42 form a rigid lever system.

The shaft 38 linking the intermediate lever 41 and the drive lever 42 to one another likewise forms a pivot point.

The intermediate lever 41 can readily be swivelled around this pivot point with respect to the first drive lever arm 421 if the pinch roller 30 engages with the capstan spindle 14. To reduce friction between the drive lever 42 and intermediate lever 41, a region around said shaft 38 is shaped in a raised manner on the first drive lever arm 421. This region, which extends downwards, is indicated by a circular line 429.

The lift roller 35 is pivotably mounted on a shaft 34 parallel to the shaft 33 of the pinch roller 30 between the vertex of the two pinch lever arms 31, 32 and the pinch roller 30. As can be seen, in particular by reference to the sectional representation as shown in FIG. 4c, the lift roller 35 has a first or lower, cylindrically shaped region 351 and a second region 353 which adjoins the latter and which is shaped at the bottom as a flange 352 and, on top thereof, essentially in a conical fashion, with its diameter increasing towards the upper edge. The conically shaped second region 353 brings about the lifting of the actuation device which has been mentioned when, on swivelling the latter into the working position (as shown in FIG. 4a), the lift roller 35 engages with a second guide 75 (FIGS. 3a–4a) which is arranged at a specified height above the chassis 1.

The operation of the actuation device described so far is explained by reference to FIGS. 3a–4c or emerges from the further description.

FIGS. 3a to 3c each show a position of the actuation device between the rest position and working position of the pinch roller 30, the recording medium 20 being stretched in front of the capstan spindle 14 by means of the loading element 27. The respective positions of the pinch lever 3 with respect to the drive device 4 shown in FIGS. 2 to 3b illustrate in this connection the controlling action of the guide 61 via the pin 37 on the movement sequence of the pinch lever 3 around the shaft 36 which is common to the intermediate lever 41 and which forms the abovementioned link between the pinch lever 3 and the drive device 4.

With respect to FIG. 3a, FIGS. 3b and 3c show the actuation device closer to the working position of the pinch roller 30. The working position of the pinch roller 30 is shown in FIG. 4a. In the position of the actuation device shown in FIG. 3c, both the lift roller 35 and the pinch roller 30, or its shaft 33, are in engagement with a supporting device 7.

The supporting device 7 can be swivelled around a shaft 76 which is perpendicular and fixed with respect to the chassis 1, the swivelling range being limited by two stops on the chassis 1 which are not shown. The end positions of the supporting device 7 which can be reached as a result of the two stops are shown in FIGS. 3b and 4a. The supporting device 7 has a first, lower supporting lever arm 71 and a second, upper supporting lever arm 72 (with dotted shading), which arms are formed essentially by triangular strips which are parallel to the chassis 1 and are linked to one another in a fixed manner by a vertical crosspiece 73 (FIGS. 4b and 4d). Both supporting lever arms 71, 72 are assigned a fixed height position above the chassis 1 in each case. At their respective lever end or at their respective side, which are situated opposite the shaft 76 of the supporting device 7 and are referred to below as end faces, the two supporting lever arms 71; 72 each have a recess 711; 721 FIGS. 3a and 3b. The shaft 33 of the pinch roller 30 engages with these recesses when the actuation device is swivelled from its position shown in FIG. 3b into its position shown in FIG. 3c.

The two recesses 711, 721 are of prism-type and are formed with respect to one another in such a way that they are able to enclose, in a complementary manner, the shaft 33 of the pinch roller 30 in an angle of more than 180 degrees, and this brings about not only a fixing of the pinch roller 30 parallel to the capstan spindle 14 but also results in very small friction or contact areas between the recesses 711, 721 and the shaft 33. Shoulders 331, 332 (FIG. 4b) which are formed at the ends of the shaft 33 of the pinch roller 30 and which are matched to the spacing of the two recesses 711, 721 for the abovementioned engagement of the shaft 33 of the pinch roller 30 also ensure at the same time a fixing of the lift of the actuation device above the chassis 1, which lift is brought about by means of the lift roller 35 and the second guide 75. The second guide 75 is formed in the lower supporting lever arm 71.

The second guide 75 forms, moreover, a second guide for controlling the movement sequence of the pinch lever 3 around the shaft 36 which it has in common with the intermediate lever 41. The first guide 61 in the chassis 1 determines the movement sequence of the pinch lever 3 around the shaft 36, which it has in common with the intermediate lever 41, between its position shown in FIG. 2 and its position shown in FIG. 3b.

The second guide 75 is formed at a predetermined spacing from the recesses 711, 721 on the end face of the lower supporting lever 71 and is shaped in such a way that it preferably has three guide regions 751, 752, 753 (FIG. 3a). The first guide region 751, with which the conically shaped region 353 (FIG. 4c) of the lift roller 35 first engages on swivelling in the direction of the working position, is formed by a lead-in lug or by its capstan-side edge. The start of the lead-in lug forms the triangular point which is situated opposite that side of the triangle which is assigned to the crosspiece 73. The second and third guide regions 752, 753 are formed by a two-part slot, adjoining the first guide region 751, of constant width and predetermined length, which slot is arranged in the lower supporting lever 71 around the recesses 711, 721. The second guide region 752 extends approximately parallel to that side of the triangle which runs from the lead-in lug to the shaft 76 of the supporting device 7. The third guide region 753, which has an arc-like path, is directed towards the side of the triangle assigned to the crosspiece 73 and is suitably matched to the shaft spacing of pinch roller 30 and lift roller 35.

In the first guide region 751, with which the supporting device 7, which is preferably freely movable between the two stops mentioned, is brought into its end position shown in FIG. 3b, the lift mentioned of the actuation device takes place. As a result of the conically shaped second region 353 of the lift roller 35 rolling along the capstan-side edge of the lead-in lug, the actuation device is lifted to such an extent that the lift roller 35 engages with its flange 352 (FIG. 4c) on reaching its position shown in FIG. 3b, with the result that the actuation device reaches the height position above the chassis 1 shown in FIGS. 4b–4d.

In the pinch lever position shown in FIG. 3b, which indicates the transition to the second guide region 752, the shaft 33 of the pinch roller 30 does not as yet make contact with the supporting levers 71, 72. The engagement of the shaft 33 of the pinch roller 30 with the recesses 711, 721 takes place if the pinch lever 3 is moved from the position shown in the FIG. 3b into the position shown in FIG. 3c. The edge 722, which projects with respect to the supporting lever 71, on the end face of the upper supporting lever arm 72, with which the shaft 33 of the pinch roller 30 first makes contact on swivelling in the direction of the working position in the process, guides the shaft 33 of the pinch roller 30 during its movement directed towards the recesses 711, 721. The sliding of the shaft 33 of the pinch roller 30 into the recesses 711, 721 takes place when the pinch lever 3 reaches the position shown in FIG. 3c. The recesses 711, 721 are shaped in such a way and are arranged with respect to the second guide region 752 that the sliding of the shaft 33 of the pinch roller 30 into the recesses 711, 721 and also out of the latter (during swivelling of the actuation device in the direction of the rest position shown in FIG. 2) takes place with an easy action.

In the second guide region 752 and in the third guide region 753, which determines the further movement sequence of the pinch roller 30 towards the capstan spindle 14, the lift roller 35 rests on both sides with its flange 352 on the lower supporting lever arm 71. The width of the slot is chosen in such a way that it has a small clearance with respect to the cylindrical region 351 (FIG. 4c) of the lift roller 35. In the pinch roller position shown in FIG. 3c, which indicates the transition to the third guide region 753, the pinch roller 30 does not yet make contact with the recording medium 20.

FIG. 4a shows the actuation device with the pinch roller 30 in a position which corresponds to the working position shown in FIG. 1b. FIG. 4b shows a partial section along the section line A—A and FIG. 4d shows a partial section along the section line B—B. FIG. 4c shows a subregion, containing the lift roller 35, of FIG. 4b in an enlarged representation.

In this position, pinch roller 30, recording medium 20 and capstan spindle 14 are in mutual engagement, the pinch roller 30 being pressed against the capstan spindle 14 by the action of the energy stored in the spring 5.

The engagement of the pinch roller 30 with the capstan spindle 14 takes place when the pinch lever 3 is moved from its position shown in FIG. 3c to its position shown in FIG. 4a. The lobe-shaped part 62 of the recess 6, which is traversed by the pin 37 during this process, is shaped in such a way that the movement of the pinch lever 3 is not influenced by it. The same also applies to the reversed direction of movement of the pinch lever 3.

Since the drive device 4 is driven still further from the instant in time of the engagement until it reaches its position shown in FIG. 4a and the pinch roller 30 cannot evade the capstan spindle 14, the pinch lever 3 must perform a swivelling movement around the shaft 33 of the pinch roller 30. As a result, the swivelling movement already mentioned around the shaft 38, which it has in common with the drive lever 42, is forced on the intermediate lever 41, which otherwise forms a rigid lever system with the drive lever 42. As a result, the intermediate lever 41 leaves the stop on the pinch lever arm 421 so that the spring 5, which is pretensioned by the same stop, acts on the capstan spindle 14 with the energy stored in it and the proportion of the energy which results from the forced swivelling movement of the intermediate lever 41 around the shaft 38 which it has in common with the drive lever 42. Because of the small areas of contact inside the actuation device and the lift roller 35 with the supporting device 7 and of the shaft 33 of the pinch roller 30 with the supporting device 7, only insignificant frictional forces have to be overcome during this process.

The supporting device 7, as well as the pinch lever 3 and the levers 41, 42 of the drive device 4 can be manufactured inexpensively from punched sheet-metal parts.

The invention is suitable, in particular, for video recorders in which the capstan spindle is arranged on the drive mechanism chassis outside the cassette region.

We claim:

1. An actuating device for a pinch roller in a tape recording/playing device having a capstan spindle driven by a drive mechanism supported on a chassis, said actuating device comprising:

a movable pinch lever supporting said pinch roller and engaging a guide path defined by said chassis;

at least one drive lever rotatably coupled to said pinch lever and mounted on said chassis to pivot about a fixed axis normal to said chassis for swiveling said pinch roller along said guide path between resting and working positions;

resilient means connected to said at least one drive lever for urging said pinch roller against said capstan spindle only in said working position;

first guide means for guiding said pivoting of said at least one drive lever;

a lift roller rotatably supported by said pinch lever and disposed in proximity to said pinch roller, said lift roller having a cylindrical region adjacent said pinch lever and a conical region having a diameter which increases in a direction away from said cylindrical region and said chassis; and, second guide means for guiding said pinch roller into contact with said capstan spindle, by engaging said conical region of said lift roller to impart a motion to said pinch lever in said direction away from said chassis during said swiveling of said pinch roller into said working position and by engaging said cylindrical region of said lift roller when said pinch roller contacts said capstan spindle.

2. The actuating device of claim 1, wherein said pinch lever integrally includes two angularly disposed arms, a first of said arms supporting said pinch roller and said lift roller and a second of said arms being connected to said at least one drive lever.

3. The actuating device of claim 2, wherein said guide path comprises a spiral-shaped slot formed in said chassis, said second arm having a pin engaging said slot.

4. The actuating device of claim 1, comprising first and second drive levers, said first drive lever being pivotable about said fixed axis and said second drive lever being rotatably coupled to both said first drive lever and said pinch lever.

5. The actuating device of claim 4 wherein said resilient means comprises a spring connecting said first and second drive levers, at least one of said first and second drive levers having stop means for prestressing said spring.

6. The actuating device of claim 5, wherein said first and second drive levers and said prestressed spring form an inherently rigid lever system when said pinch roller is not in said working position.

7. The actuating device of claim 1, wherein said second guide means comprises a support device pivotable about a second axis and having spaced substantially triangular first and second support arms, said support arms being permanently linked by at least one crosspiece.

8. The actuating device of claim 7, wherein said second guide means includes three guide regions, said conical region of said lift roller engaging a first of said guide regions during swiveling toward said working position, the second and third of said guide regions being formed as a slot having first and second parts, the first part of said slot having a substantially constant width and a preselected length, and the second part being arc-shaped.

\* \* \* \* \*